(12) United States Patent
Liu et al.

(10) Patent No.: US 12,504,575 B2
(45) Date of Patent: Dec. 23, 2025

(54) LIGHTING DECORATION MODULE

(71) Applicant: CHAMP VISION DISPLAY INC., Miao-Li County (TW)

(72) Inventors: Chin-Ku Liu, Miao-Li County (TW); Chung-Hao Wu, Miao-Li County (TW); Hsin-Hung Lee, Miao-Li County (TW); Chun-Chien Liao, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 18/530,223

(22) Filed: Dec. 6, 2023

(65) Prior Publication Data

US 2024/0201432 A1   Jun. 20, 2024

(30) Foreign Application Priority Data

Dec. 16, 2022 (TW) ................... 111213909

(51) Int. Cl.
  *F21V 8/00* (2006.01)
(52) U.S. Cl.
  CPC .................. *G02B 6/0055* (2013.01)
(58) Field of Classification Search
  CPC .................................................. G02B 6/0055
  See application file for complete search history.

(56) References Cited

U.S. PATENT DOCUMENTS

| | | | |
|---|---|---|---|
| 10,883,670 B1 | 1/2021 | Liu et al. | |
| 11,187,841 B2 * | 11/2021 | Liao | G02B 6/0088 |
| 2007/0127264 A1 * | 6/2007 | Sugiura | G02B 6/0076 |
| | | | 362/613 |
| 2012/0188792 A1 | 7/2012 | Matsumoto et al. | |
| 2013/0070482 A1 | 3/2013 | Miyazaki et al. | |
| 2014/0198524 A1 | 7/2014 | Tseng | |
| 2015/0235508 A1 | 8/2015 | Shinohara et al. | |
| 2015/0268404 A1 | 9/2015 | Chiu et al. | |
| 2016/0238777 A1 * | 8/2016 | Chen | G02B 6/0016 |
| 2016/0306097 A1 | 10/2016 | Fujita et al. | |

(Continued)

FOREIGN PATENT DOCUMENTS

| | | |
|---|---|---|
| CN | 1627104 | 6/2005 |
| CN | 100381914 | 4/2008 |

(Continued)

*Primary Examiner* — Abdulmajeed Aziz
*Assistant Examiner* — Jessica M Apenteng
(74) *Attorney, Agent, or Firm* — JCIPRNET

(57) ABSTRACT

A lighting decoration module includes an LGP, at least one light source, and first and second optical microstructures. The LGP has at least one light incident surface and first and second light exit surfaces that are opposite to each other and connect the light incident surface. The light source corresponds to the light incident surface. The first optical microstructures are disposed on the first light exit surface and each has a first surface facing the light source. A first angle between the first surface and the first light exit surface is within a range from 40-60 degrees or 15-35 degrees. The second optical microstructures are disposed on the second light exit surface and each has a second surface facing the light source. A second angle between the second surface and the second light exit surface is within a range from 40-60 degrees.

7 Claims, 10 Drawing Sheets

(56) References Cited

U.S. PATENT DOCUMENTS

| | | | |
|---|---|---|---|
| 2018/0267344 A1 | 9/2018 | Wu | |
| 2019/0094442 A1* | 3/2019 | Shinohara | G02B 6/0036 |
| 2019/0353837 A1 | 11/2019 | Shinohara et al. | |
| 2019/0361164 A1 | 11/2019 | Jo et al. | |
| 2020/0233142 A1 | 7/2020 | Liao et al. | |
| 2022/0003916 A1* | 1/2022 | Hasegawa | G02B 6/0038 |

FOREIGN PATENT DOCUMENTS

| | | |
|---|---|---|
| CN | 101449309 | 6/2009 |
| CN | 102425745 | 4/2012 |
| CN | 102681083 | 9/2012 |
| CN | 104864362 | 8/2015 |
| CN | 105913783 | 8/2016 |
| CN | 106663398 | 5/2017 |
| CN | 207817246 | 9/2018 |
| CN | 109212654 | 1/2019 |
| CN | 110622236 | 12/2019 |
| JP | S4810920 | 4/1973 |
| JP | 2003045214 | 2/2003 |
| JP | 2006075362 | 3/2006 |
| JP | 2012156132 | 8/2012 |
| JP | 2015118128 | 6/2015 |
| JP | 2015156317 | 8/2015 |
| JP | 2015158317 | 9/2015 |
| JP | 2016157582 | 9/2016 |
| JP | 6402812 | 10/2018 |
| TW | 200923500 | 6/2009 |
| TW | 1350395 | 10/2011 |
| TW | 201406561 | 2/2014 |
| TW | 201614290 | 4/2016 |
| TW | 201618062 | 5/2016 |
| TW | 1574061 | 3/2017 |

\* cited by examiner

LIGHTING DECORATION MODULE

CROSS-REFERENCE TO RELATED APPLICATION

This application claims the priority benefit of Taiwan application serial no. 111213909, filed on Dec. 16, 2022. The entirety of the above-mentioned patent application is hereby incorporated by reference herein and made a part of this specification.

BACKGROUND OF THE INVENTION

1. Field of the Invention

The invention relates to a light guide module and more particularly relates to a lighting decoration module.

2. Description of Related Art

With the advancement of illumination technologies, in addition to lamps that are generally configured to provide illumination, lighting decoration panels for decorative use have also been developed on the market. In these lighting decoration panels, optical microstructures are formed on bottom surfaces of light guide plates (LGPs), and the position of each optical microstructure and an angle of a reflection surface of the optical microstructure are determined according to the desired effect that the lighting decoration panels need to achieve. After light emitted by a light source is incident from a side surface (a light incident surface) of the LGP, the light may be reflected by the optical microstructures, transmitted toward a light exit surface of the LGP, and then emitted, so that a user is allowed to observe patterns or words constituted by the light from the light exit surface of the LGP. However, most of the current lighting decoration panels emit the light provided by the light source from one single side of the LGP, while less amount of light is emitted from the other side facing away from the one single side. As such, application requirements of lighting decoration panels for double-sided display or illumination cannot be satisfied.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

One or more embodiments of the invention provide a lighting decoration module capable of displaying patterns in a double-sided manner.

One or more embodiments of the invention provide a lighting decoration module capable of displaying patterns and providing illumination.

Other objectives and advantages of the invention may be further understood from the technical features disclosed in the invention.

In order to achieve one, some, or all of the aforementioned objectives or other objectives, an embodiment of the invention provides a lighting decoration module. The lighting decoration module includes a light guide plate (LGP), at least one light source, a plurality of first optical microstructures, and a plurality of second optical microstructures. The LGP has at least one light incident surface, a first light exit surface, and a second light exit surface, and the first and second light exit surfaces connect the at least one light incident surface and are opposite to each other. The at least one light source is disposed corresponding to the at least one light incident surface of the LGP. The first optical microstructures are disposed on the first light exit surface of the LGP, each of the plurality of first optical microstructures which has a first surface facing the at least one light source. A first angle between the first surface and the first light exit surface is greater than or equal to 40 degrees and less than or equal to 60 degrees. The second optical microstructures are disposed on the second light exit surface of the LGP, each of the plurality of second optical microstructures which has a second surface facing the at least one light source. A second angle between the second surface and the second light exit surface is greater than or equal to 40 degrees and less than or equal to 60 degrees.

In order to achieve one, some, or all of the aforementioned objectives or other objectives, another embodiment of the invention provides a lighting decoration module. The lighting decoration module includes an LGP, at least one light source, a plurality of first optical microstructures, and a plurality of second optical microstructures. The LGP has at least one light incident surface, a first light exit surface, and a second light exit surface, and the first and second light exit surfaces connect the at least one light incident surface and are opposite to each other. The at least one light source is disposed corresponding to the at least one light incident surface of the LGP. The first optical microstructures are disposed on the first light exit surface of the LGP, each of the plurality of first optical microstructures which has a first surface facing the at least one light source. A first angle between the first surface and the first light exit surface is greater than or equal to 15 degrees and less than or equal to 35 degrees. The second optical microstructures are disposed on the second light exit surface of the LGP, each of the plurality of second optical microstructures which has a second surface facing the at least one light source. A second angle between the second surface and the second light exit surface is greater than or equal to 40 degrees and less than or equal to 60 degrees.

In view of the above, in the lighting decoration module provided in one or more embodiments of the invention, two kinds of optical microstructures are respectively disposed on the two opposite light exit surfaces of the LGP. When the angles between the surfaces of the two types of optical microstructures facing the light source and the corresponding light exit surfaces are greater than or equal to 40 degrees and less than or equal to 60 degrees, the lighting decoration module is allowed to achieve the double-sided display effects on both sides of the two light exit surfaces. When the angle between the surface of one of the two types of optical microstructures facing the light source and the corresponding light exit surface is are greater than or equal to 15 degrees and less than or equal to 35 degrees, and the angle between the surface of the other of the two types of optical microstructures facing the light source and the corresponding light exit surface is greater than or equal to 40 degrees and less than or equal to 60 degree, the lighting decoration module is allowed to achieve a single-sided display effect on one side of one of the light exit surfaces and provide illumination on one side of the other light exit surface.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
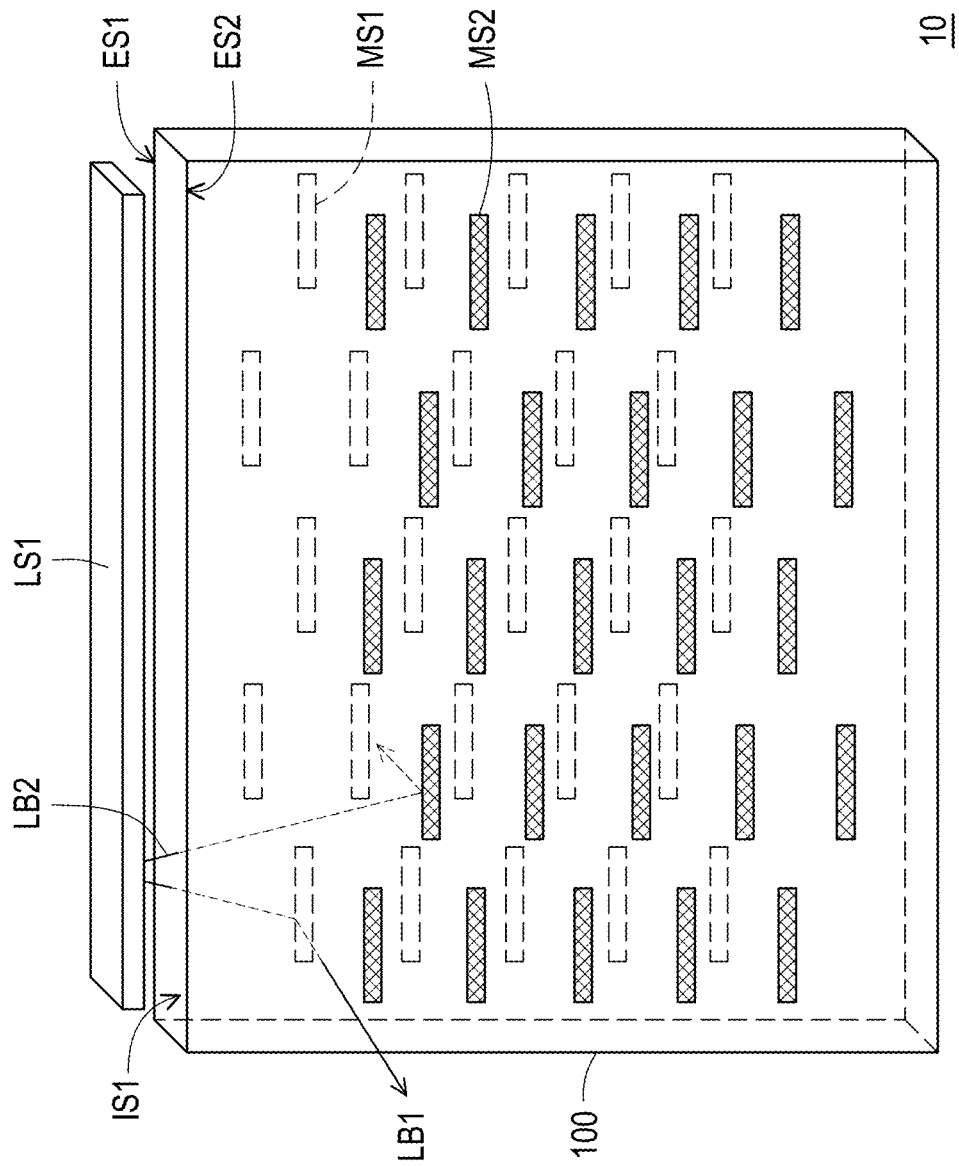
FIG. 1 is a schematic three-dimensional view illustrating a lighting decoration module according to a first embodiment of the invention.
Figure 2:
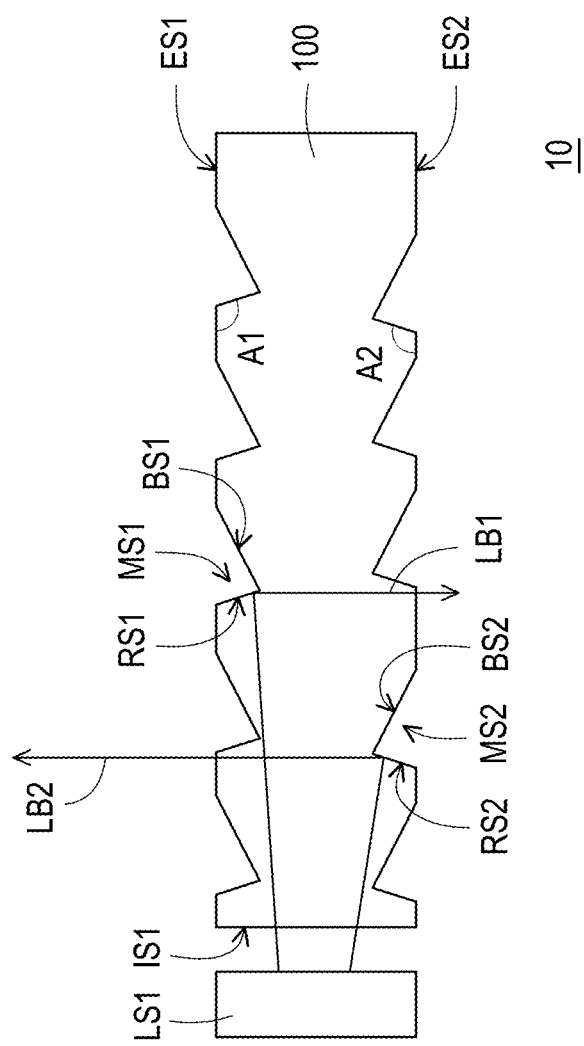
FIG. 2 is a schematic cross-sectional view illustrating the lighting decoration module depicted in FIG. 1.
Figure 3:
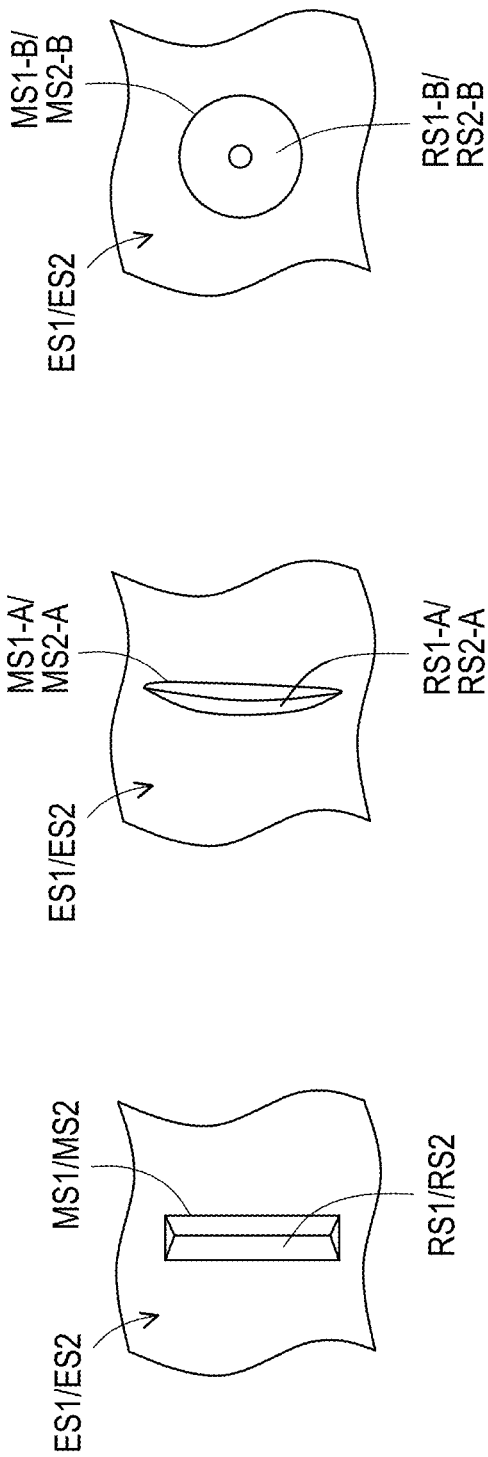
FIG. 3A is a schematic top view illustrating the first optical microstructures or the second optical microstructures depicted in FIG. 1.
FIG. 3B and FIG. 3C are schematic top views illustrating optical microstructures according to other variant embodiments of the invention.

FIG. 1 is a schematic three-dimensional view illustrating a lighting decoration module according to a first embodiment of the invention. FIG. 2 is a schematic cross-sectional view illustrating the lighting decoration module depicted in FIG. 1. FIG. 3A is a schematic top view illustrating the first optical microstructures or the second optical microstructures depicted in FIG. 1. FIG. 3B and FIG. 3C are schematic top views illustrating optical microstructures according to other variant embodiments of the invention.

With reference to FIG. 1 and FIG. 2, a lighting decoration module 10 includes a light guide plate (LGP) 100, a first light source LS1, a plurality of first optical microstructures MS1, and a plurality of second optical microstructures MS2. The LGP 100 has a first light incident surface IS1, a first light exit surface ES1, and a second light exit surface ES2, and the first light exit surface ES1 and the second light exit surface ES2 connect the first light incident surface IS1 and are opposite to each other. The first light source LS1 is located on one side of the first light incident surface IS1 of the LGP 100 and disposed corresponding to the first light incident surface IS1. The first optical microstructures MS1 are disposed on the first light exit surface ES1 of the LGP 100. The second optical microstructures MS2 are disposed on the second light exit surface ES2 of the LGP 100.

Note that each of the plurality of first optical microstructures MS1 has a first surface RS1 facing the first light source LS1 and a first backlight surface BS1 facing away from the first light source LS1, and a first angle A1 between the first surface RS1 and the first light exit surface ES1 is greater than or equal to 40 degrees and less than or equal to 60 degrees. Each of the plurality of second optical microstructures MS2 has a second surface RS2 facing the first light source LS1 and a second backlight surface BS2 facing away from the first light source LS1, and a second angle A2 between the second surface RS2 and the second light exit surface ES2 is greater than or equal to 40 degrees and less than or equal to 60 degrees.

For instance, a first light beam LB1 emitted by the first light source LS1 may be transmitted in the LGP 100 and emitted from the second light exit surface ES2 of the LGP 100 after the first light beam LB1 is reflected by the first surface RS1 of each of the plurality of first optical microstructure MS1. A second light beam LB2 emitted by the first light source LS1 may be transmitted in the LGP 100 and emitted from the first light exit surface ES1 of the LGP 100 after the second light beam LB2 is reflected by the second surface RS2 of each of the plurality of second optical microstructure MS2. More particularly, through the first optical microstructures MS1 disposed on the first light exit surface ES1, a portion of the light beam (such as the first light beam LB1) emitted by the first light source LS1 may be guided to the second light exit surface ES2 and may then exit; through the second optical microstructures MS2 disposed on the second light exit surface ES2, another portion of the light beam (such as the second light beam LB2) emitted by the first light source LS1 may be guided to the first light exit surface ES1 and may then exit.

Therefore, in the embodiment, a first pattern may be displayed on one side of the second light exit surface ES2 of the LGP 100 through arrangement and distribution of the first optical microstructures MS1 on the first light exit surface ES1, and a second pattern may be displayed on one side of the first light exit surface ES1 of the LGP 100 through arrangement and distribution of the second optical microstructures MS2 on the second light exit surface ES2. The first pattern and the second pattern may be the same or different from each other. That is, the lighting decoration module 10 provided in this embodiment is able to display patterns on both sides.

In the embodiment, the first optical microstructures MS1 are, for instance, concave structures recessed from the first light exit surface ES1 toward the second light exit surface ES2, for instance, and the second optical microstructures MS2 are, for instance, concave structures recessed from the second light exit surface ES2 toward the first light exit surface ES1. Therefore, the first surface RS1 of each of the plurality of first optical microstructure MS1 is located between the first backlight surface BS1 and the first light incident surface IS1 (or the first light source LS1), and the second surface RS2 of each of the plurality of second optical microstructure MS2 is located between the second backlight surface BS2 and the first light incident surface IS1.

However, the invention is not limited thereto. In another embodiment not shown in the drawings, the first optical microstructures may also be convex structures protruding from the first light exit surface toward a direction away from the second light exit surface, and the second optical microstructures may also be convex structures protruding from the second light exit surface toward a direction away from the first light exit surface. Therefore, the first backlight surface of each of the plurality of first optical microstructure may also be located between the first surface and the first light incident surface IS1, and the second backlight surface of each of the plurality of second optical microstructure may also be located between the second surface and the first light incident surface IS1. In still another embodiment not shown in the drawings, the optical microstructures on one light exit surface of the LGP may be convex structures, while the optical microstructures on the other light exit surface may be concave structures.

In the embodiment, a profile of an orthogonal projection of the first optical microstructures MS1 on the first light exit surface ES1 or a profile of an orthogonal projection of the second optical microstructures MS2 on the second light exit surface ES2 may have a bar shape (as shown in FIG. 3A), which should however not be construed as a limitation to the invention. In another variant embodiment, a profile of an orthogonal projection of first optical microstructures MS1-A on the first light exit surface ES1 or a profile of an orthogonal projection of the second optical microstructures MS2-A on the second light exit surface ES2 may have a crescent shape (as shown in the FIG. 3B), where an edge of a first surface RS1-A of each of the plurality of first optical microstructure MS1-A connecting the first light exit surface ES1 or an edge of a second surface RS2-A of each of the plurality of second optical microstructure MS2-A connecting the second light exit surface ES2 is a convex curve protruding toward the light incident surface of the LGP.

In yet another variant embodiment, a profile of an orthogonal projection of first optical microstructures MS1-B on the first light exit surface ES1 or a profile of an orthogonal projection of second optical microstructures MS2-B on the second light exit surface ES2 may be circular (as shown in FIG. 3C), where the optical microstructures may be conical structures recessed from the light exit surfaces (i.e., concave structures whose circular diameter gradually decreases from openings of the concave structures toward bottoms of the concave structures), and an edge of a first surface RS1-B connecting the first light exit surface ES1 or an edge of a second surface RS2-B connecting the second light exit surface ES2 is an arc protruding toward the light incident surface of the LGP.

Another embodiment will be provided hereinafter to elaborate the invention, where the same component will be marked by the same reference numbers, and the description of the same technical content will be omitted. The omitted content may be referred to as those provided above and thus will not be repeated hereinafter.

Figure 4:
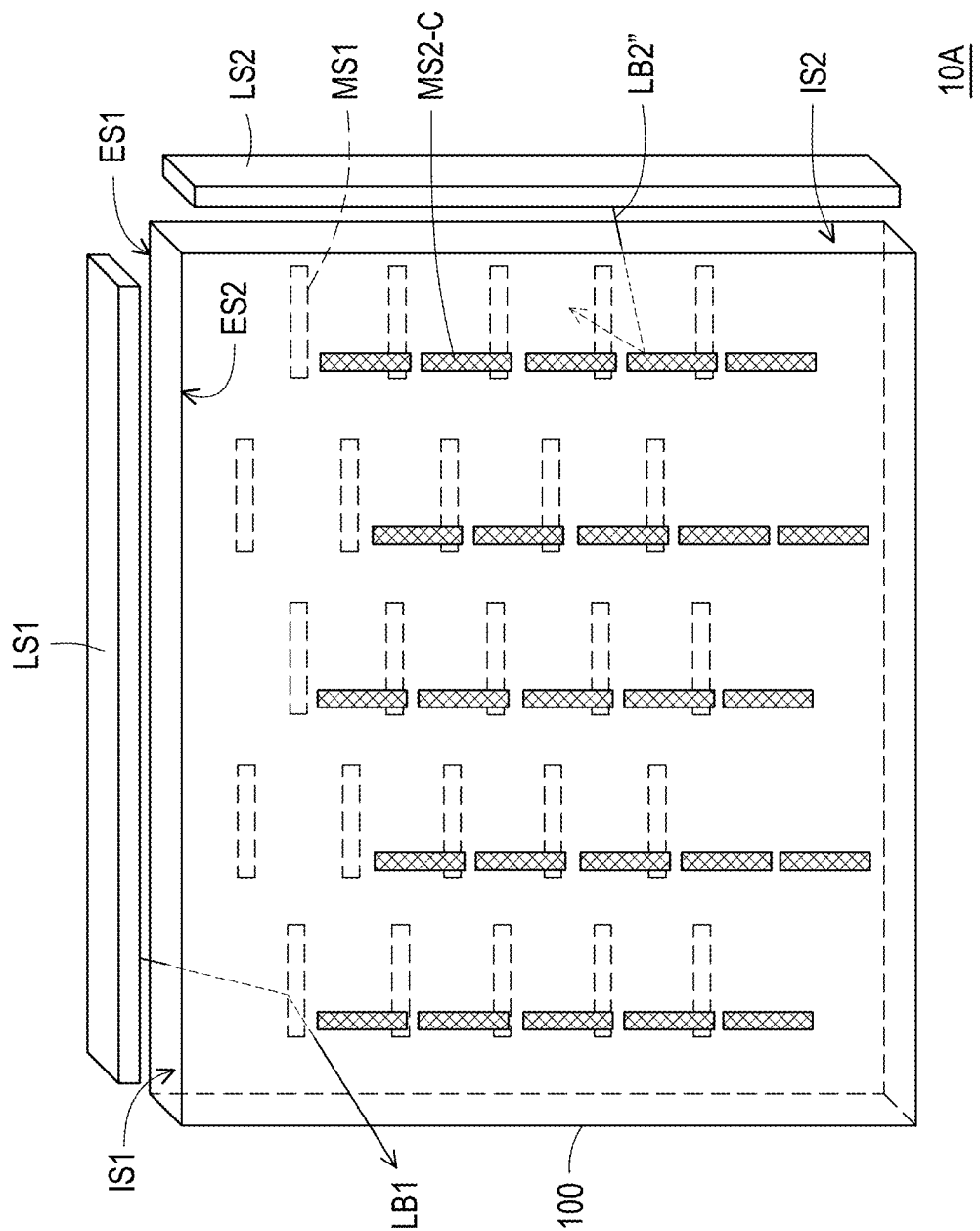
FIG. 4 is a schematic three-dimensional view illustrating a lighting decoration module according to a second embodiment of the invention.

FIG. 4 is a schematic three-dimensional view illustrating a lighting decoration module according to a second embodiment of the invention. With reference to FIG. 4, the difference between a lighting decoration module 10A provided in this embodiment and the lighting decoration module 10 depicted in FIG. 1 lies in that the second surface of each of the plurality of second optical microstructure is arranged in a different manner. Specifically, in the embodiment, the lighting decoration module 10A may further include a second light source LS2 disposed on one side of the second light incident surface IS2 of the LGP 100.

In particular, the first light incident surface IS1 of the LGP 100 connects the second light incident surface IS2. That is, the first light source LS1 and the second light source LS2 are disposed on two adjacent sides of the LGP 100. In the embodiment, the second surface of each of the plurality of second optical microstructure MS2-C on the second light exit surface ES2 faces the second light source LS2 (or the second light incident surface IS2).

For instance, a second light beam LB2" emitted by the second light source LS2 may be transmitted in the LGP 100, reflected by the second optical microstructures MS2-C, and then emitted from the first light exit surface ES1 of the LGP 100. More specifically, in the embodiment, the first light beam LB1 provided by the first light source LS1 serves to display patterns formed by the first optical microstructures MS1 on one side of the second light exit surface ES2 of the LGP 100, and the second light beam LB2" provided by the second light source LS2 serves to display patterns formed by second optical microstructures MS2-C on one side of the first light exit surface ES1 of the LGP 100.

Figure 5:
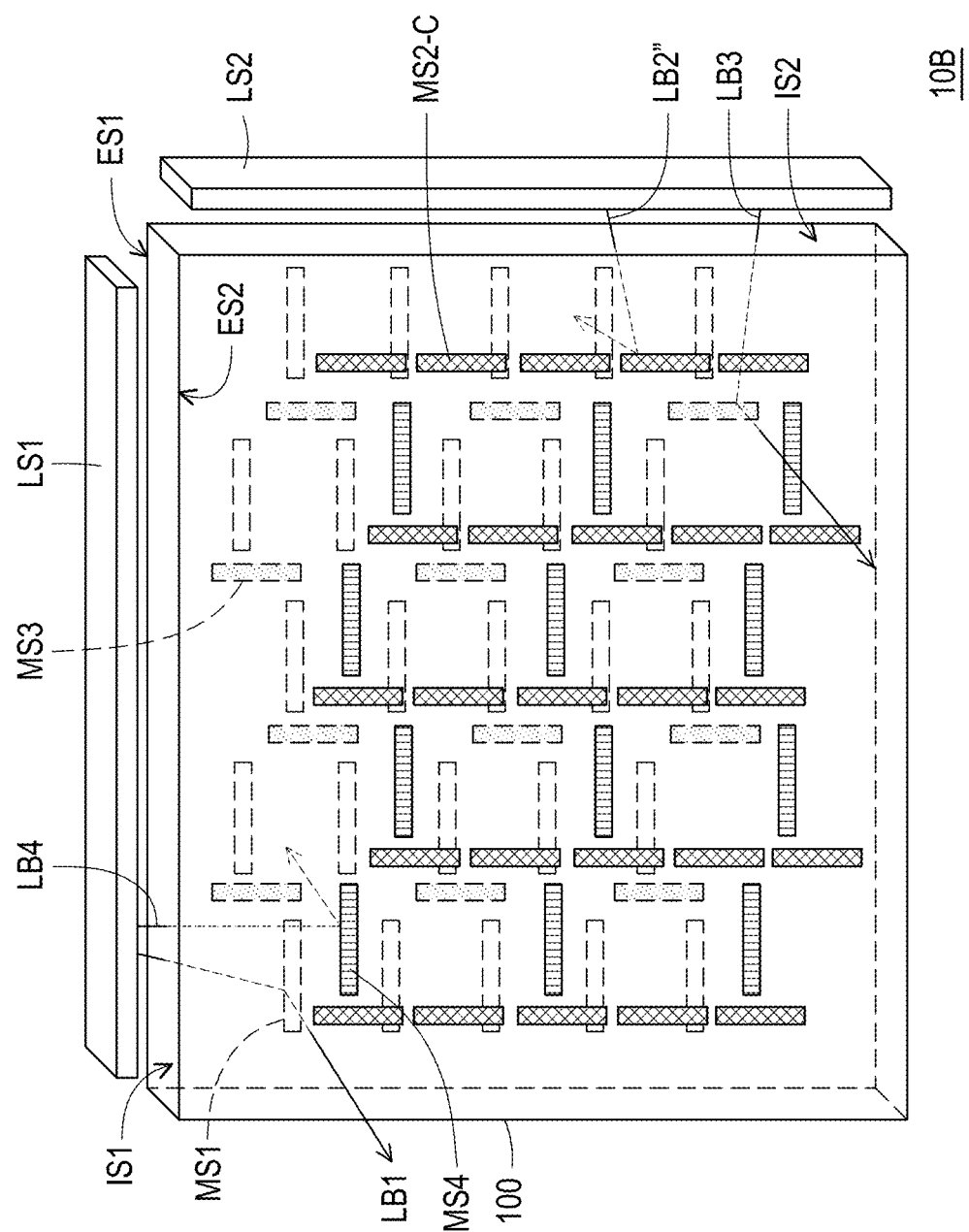
FIG. 5 is a schematic three-dimensional view illustrating a lighting decoration module according to a third embodiment of the invention.
Figure 6:
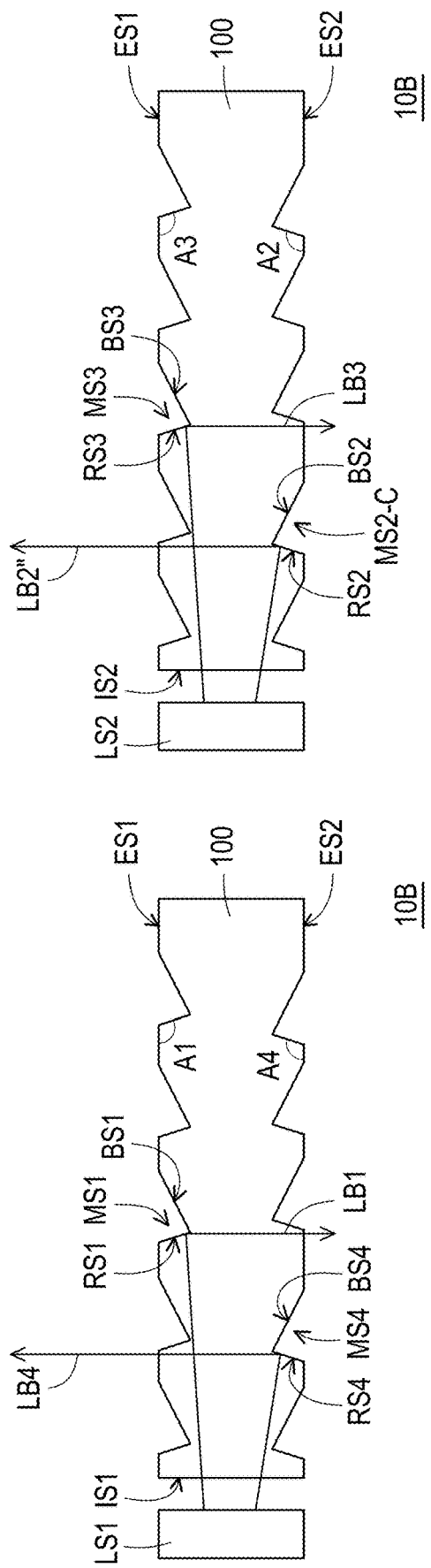
FIG. 6A and FIG. 6B are schematic cross-sectional views illustrating the lighting decoration module depicted in FIG. 5 in an arrangement direction of the first light source and the LGP and in an arrangement direction of the second light source and the LGP.

FIG. 5 is a schematic three-dimensional view illustrating a lighting decoration module according to a third embodiment of the invention. FIG. 6A and FIG. 6B are schematic cross-sectional views illustrating the lighting decoration module depicted in FIG. 5 in an arrangement direction of the first light source and the LGP and in an arrangement direction of the second light source and the LGP. With reference to FIG. 5, FIG. 6A and FIG. 6B, the difference between a lighting decoration module 10B provided in this embodiment and the lighting decoration module 10A depicted in FIG. 4 lies in that the number of patterns that can be displayed by the respective lighting decoration modules is different.

In detail, according to the embodiment, the lighting decoration module 10B may further include a plurality of third optical microstructures MS3 and a plurality of fourth optical microstructures MS4. The third optical microstructures MS3 are disposed on the first light exit surface ES1 of the LGP 100. These fourth optical microstructures MS4 are disposed on the second light exit surface ES2 of the LGP 100.

Note that each of the plurality of third optical microstructures MS3 has a third surface RS3 facing the second light source LS2 and a third backlight surface BS3 facing away from the second light source LS2, and a third angle A3 between the third surface RS3 and the first light exit surface ES1 is greater than or equal to 40 degrees and less than or equal to 60 degrees. Each of the plurality of fourth optical microstructures MS4 has a fourth surface RS4 facing the first light source LS1 and a fourth backlight surface BS4 facing away from the first light source LS1, and a fourth angle A4 between the fourth surface RS4 and the second light exit surface ES2 is greater than or equal 40 degrees and less than or equal to 60 degrees.

More specifically, in the embodiment, the first surface RS1 of each of the plurality of first optical microstructure MS1 on the first light exit surface ES1 and the third surface RS3 of each of the plurality of third optical microstructure MS3 are disposed toward different light sources, respectively, and the second surface RS2 of each of the plurality of second optical microstructure MS2-C on the second light exit surface ES2 and the fourth surface RS4 of each of the plurality of fourth optical microstructure MS4 are disposed toward different light sources, respectively.

For instance, the first light beam LB1 emitted by the first light source LS1 and the third light beam LB3 emitted by the second light source LS2 may be transmitted in the LGP 100, respectively reflected by the first surface RS1 of each of the plurality of first optical microstructure MS1 and the third surface RS3 of each of the plurality of third optical microstructure MS3, and then emitted from the second light exit surface ES2 of the LGP 100. The second light beam LB2" emitted by the second light source LS2 and the fourth light beam LB4 emitted by the first light source LS1 may be transmitted within the LGP 100, respectively reflected by the second surface RS2 of each of the plurality of second optical microstructure MS2-C and the fourth surface RS4 of each of the plurality of fourth optical microstructure MS4, and then emitted from the first light exit surface ES1 of the LGP 100.

Through the first optical microstructures MS1 and the third optical microstructures MS3 disposed on the first light exit surface ES1, a portion of the light beam (such as the first light beam LB1) emitted by the first light source LS1 and a portion of the light beam (such as the third light beam LB3) emitted by the second light source LS2 may be guided to the second light exit surface ES2 and may then exit, and via the second optical microstructures MS2-C and the fourth optical microstructures MS4 disposed on the second light exit surface ES2, another portion of the light beam (such as the fourth light beam LB4) emitted by the first light source LS1 and another portion of the light beam (such as the second light beam LB2") emitted by the second light source LS2 may be guided to the first light exit surface ES1 and may then exit.

Therefore, under the irradiation of the first light source LS1, a first pattern may be displayed on one side of the second light exit surface ES2 of the LGP 100 through arrangement and distribution of the plurality of first optical microstructures MS1 on the first light exit surface ES1, and a fourth pattern may be displayed on one side of the first light exit surface ES1 of the LGP 100 through arrangement and distribution of the plurality of fourth optical microstructures MS4 on the second light exit surface ES2. Under the irradiation of the second light source LS2, a second pattern may be displayed on one side of the first light exit surface ES1 of the LGP 100 through arrangement and distribution of the plurality of second optical microstructures MS2-C on the second light exit surface ES2, and a third pattern may be displayed on one side of the second light exit surface ES2 of the LGP 100 through arrangement and distribution of the plurality of third optical microstructures MS3 on the first light exit surface ES1. That is, the lighting decoration module 10B provided in this embodiment is capable of performing the function of displaying four patterns on both sides, and the two patterns displayed on the same side of the LGP 100 may be independently controlled by the first light source LS1 and the second light source LS2, respectively.

Similar to the first optical microstructures MS1, the third optical microstructures MS3 are, for instance, concave structures recessed from the first light exit surface ES1 toward the second light exit surface ES2. Similar to the second optical microstructures MS2-C, the fourth optical microstructures MS4 are, for instance, concave structures recessed from the second light exit surface ES2 toward the first light exit surface ES1. Therefore, the third surface RS3 of each of the plurality of third optical microstructure MS3 is located between the third backlight surface BS3 and the second light incident surface IS2 (or the second light source LS2), and the fourth surface RS4 of each of the plurality of fourth optical microstructure MS4 is located between the fourth backlight surface BS4 and the first light incident surface IS1 (or the first light source LS1).

Since the profile of the orthogonal projection of the optical microstructures on the corresponding light exit surface according to this embodiment is similar to the profile of the orthogonal projection of the optical microstructures depicted in FIG. 3A, detailed descriptions may be derived from the relevant paragraphs in the previous embodiment and will not be provided hereinafter.

Figure 7:
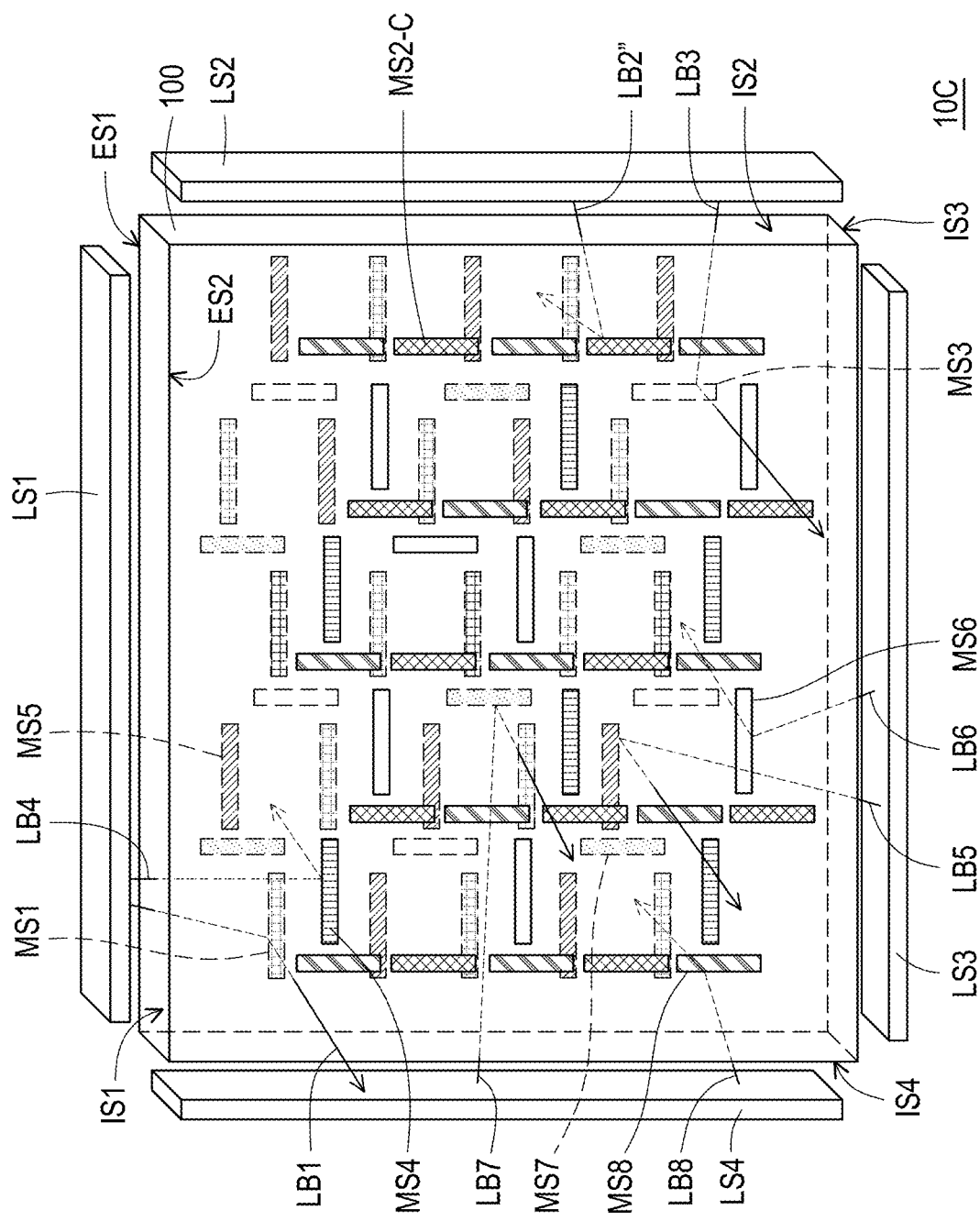
FIG. 7 is a schematic three-dimensional view illustrating a lighting decoration module according to a fourth embodiment of the invention.
Figure 8B:
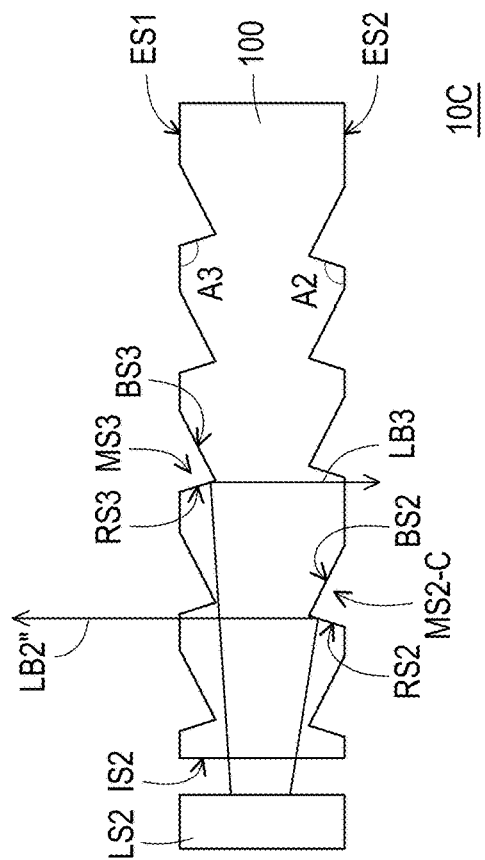
FIG. 8A to FIG. 8D are schematic cross-sectional views illustrating the lighting decoration module depicted in FIG. 7 in an arrangement direction of the first light source and the LGP, in an arrangement direction of the second light source and the LGP, in an arrangement direction of the third light source and the LGP, and in an arrangement direction of the fourth light source and the LGP.
Figure 8A:
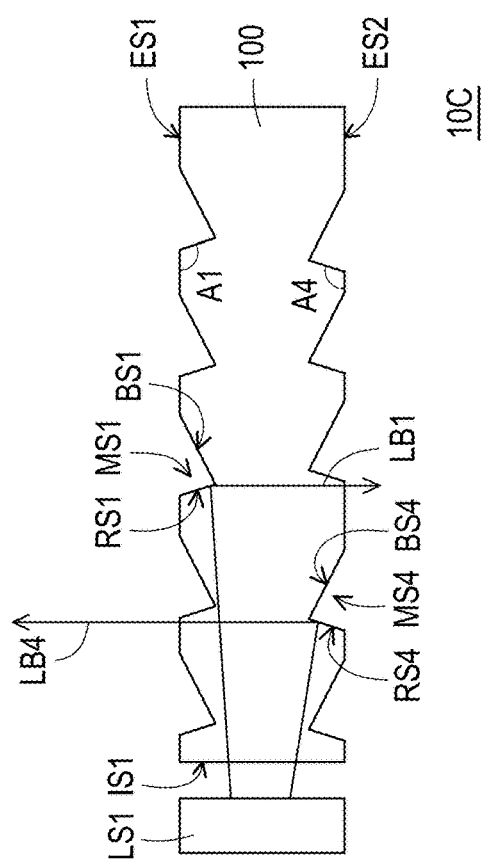
Figure 8D:
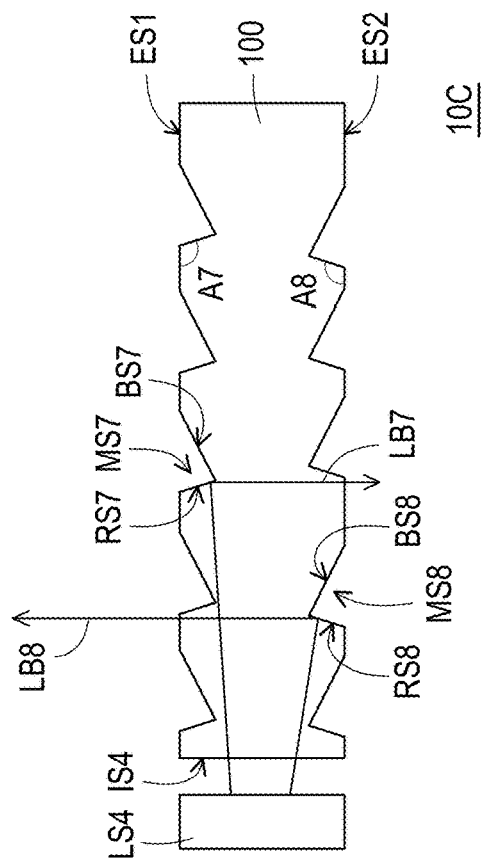
Figure 8C:
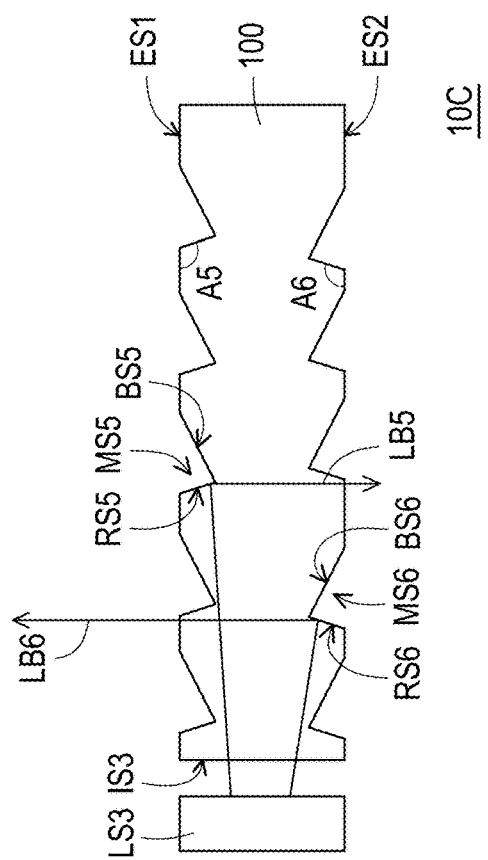

FIG. 7 is a schematic three-dimensional view illustrating a lighting decoration module according to a fourth embodiment of the invention. FIG. 8A to FIG. 8D are schematic cross-sectional views illustrating the lighting decoration module depicted in FIG. 7 in an arrangement direction of the first light source and the LGP, in an arrangement direction of the second light source and the LGP, in an arrangement direction of the third light source and the LGP, and in an arrangement direction of the fourth light source and the LGP. With reference to FIG. 7 to FIG. 8D, compared to the lighting decoration module 10B depicted in FIG. 5, a lighting decoration module 10C provided in this embodiment may further include a third light source LS3, a fourth light source LS4, a plurality of fifth optical microstructures MS5, a plurality of sixth optical microstructures MS6, a plurality of seventh optical microstructures MS7, and a plurality of eighth optical microstructures MS8. The third light source LS3 is disposed on one side of a third light incident surface IS3 of the LGP 100, and the fourth light source LS4 is disposed on one side of a fourth light incident surface IS4 of the LGP 100. Here, the third light incident surface IS3 is opposite to the first light incident surface IS1 and connects the second light incident surface IS2 and the fourth light incident surface IS4. The fourth light incident surface IS4 is opposite to the second light incident surface IS2 and connects the first light incident surface IS1 and the third light incident surface IS3.

In this embodiment, the plurality of fifth optical microstructures MS5 and the plurality of seventh optical microstructures MS7 are disposed on the first light exit surface ES1 of the LGP 100. The plurality of sixth optical microstructures MS6 and the plurality of eighth optical microstructures MS8 are disposed on the second light exit surface ES2 of the LGP 100.

Note that each of the plurality of fifth optical microstructures MS5 has a fifth surface RS5 facing the third light source LS3 and a fifth backlight surface BS5 facing away from the third light source LS3, and a fifth angle A5 between the fifth surface RS5 and the first light exit surface ES1 is greater than or equal 40 degrees and less than or equal to 60 degrees. Each of the plurality of sixth optical microstructures MS6 has a sixth surface RS6 facing the third light source LS3 and a sixth backlight surface BS6 facing away from the third light source LS3, and a sixth angle A6 between the sixth surface RS6 and the second light exit surface ES2 is greater than or equal 40 degrees and less than or equal to 60 degrees.

Each of the plurality of seventh optical microstructures MS7 has a seventh surface RS7 facing the fourth light source LS4 and a seventh backlight surface BS7 facing away from the fourth light source LS4, and a seventh angle A7 between the seventh surface RS7 and the first light exit surface ES1 is greater than or equal 40 degrees and less than or equal to 60 degrees. Each of the plurality of eighth optical microstructures MS8 has an eighth surface RS8 facing the fourth light source LS4 and an eighth backlight surface BS8 facing away from the fourth light source LS4, and an eighth angle A8 between the eighth surface RS8 and the second light exit surface ES2 is greater than or equal 40 degrees and less than or equal to 60 degrees.

More specifically, in this embodiment, on the first light exit surface ES1, the first surface RS1 of each of the plurality of first optical microstructure MS1, the third surface RS3 of each of the plurality of third optical microstructure MS3, the fifth surface RS5 of each of the plurality of fifth optical microstructure MS5, and the seventh surface RS7 of each of the plurality of seventh optical microstructure MS7 are disposed towards different light sources, respectively. Similarly, on the second light exit surface ES2, the second surface RS2 of each of the plurality of second optical microstructure MS2, the fourth surface RS4 of each of the plurality of fourth optical microstructure MS4, the sixth surface RS6 of each of the plurality of sixth optical microstructure MS6, and the eighth surface RS8 of each of the plurality of eighth optical microstructure MS8 are disposed towards different light sources, respectively.

For instance, the first light beam LB1 emitted by the first light source LS1, the third light beam LB3 emitted by the second light source LS2, a fifth light beam LB5 emitted by the third light source LS3, and a seventh light beam LB7 emitted by the fourth light source LS4 may be transmitted in the LGP 100 and emitted from the second light exit surface ES2 of the LGP 100 after the first light beam LB1 is reflected by the first surface RS1 of each of the plurality of first optical microstructure MS1, the third light beam LB3 is reflected by the third surface RS3 of each of the plurality of third optical microstructure MS3, the fifth light beam LB5 is reflected by the fifth surface RS5 of each of the plurality of fifth optical microstructure MS5, and the seventh light beam LB7 is reflected by the seventh surface RS7 of each of the plurality of seventh optical microstructure MS7.

Similarly, the second light beam LB2" emitted by the second light source LS2, the fourth light beam LB4 emitted by the first light source LS1, a sixth light beam LB6 emitted by the third light source LS3, and an eighth light beam LB8 emitted by the fourth light source LS4 may be transmitted in the LGP and emitted from the first light exit surface ES1 of the LGP 100 after the second light beam LB2" is reflected by the second surface RS2 of each of the plurality of second optical microstructure MS2, the fourth light beam LB4 is reflected by the fourth surface RS4 of each of the plurality of fourth optical microstructure MS4, the sixth light beam LB6 is reflected by the sixth surface RS6 of each of the plurality of sixth optical microstructure MS6, and the eighth light beam LB8 is reflected by the eighth surface RS8 of each of the plurality of eighth optical microstructure MS8.

Through the plurality of first optical microstructures MS1, the plurality of third optical microstructures MS3, the plurality of fifth optical microstructures MS5, and the plurality of seventh optical microstructures MS7 disposed on the first light exit surface ES1, a portion of the light beam (such as the first light beam LB1) emitted by the first light source LS1, a portion of the light beam (such as the third light beam LB3) emitted by the second light source LS2, a portion of the light beam (such as the fifth light beam LB5) emitted by the third light source LS3, and a portion of the light beam (such as the seventh light beam LB7) emitted by the fourth light source LS4 may be guided to the second light exit surface ES2 and may then exit.

Similarly, by the plurality of second optical microstructures MS2-C, the plurality of fourth optical microstructures MS4, the plurality of sixth optical microstructures MS6, and the plurality of eighth optical microstructures MS8 disposed on the second light exit surface ES2, another portion of the light beam (such as the fourth light beam LB4) emitted by the first light source LS1, another portion of the light beam (such as the second light beam LB2") emitted by second light source LS2, another portion of the light beam (such as the sixth light beam LB6) emitted by the third light source LS3, and another portion of the light beam (such as the eighth light beam LB8) emitted by the fourth light source LS4 may be guided to the first light exit surface ES1 and may then exit.

Therefore, under the irradiation of the first light source LS1, a first pattern may be displayed on one side of the second light exit surface ES2 of the LGP 100 through arrangement and distribution of the plurality of first optical microstructures MS1 on the first light exit surface ES1, and a fourth pattern may be displayed on one side of the first light exit surface ES1 of the LGP 100 through arrangement and distribution of the plurality of fourth optical microstructures MS4 on the second light exit surface ES2. Under the illumination of the second light source LS2, a second pattern may be displayed on one side of the first light exit surface ES1 of the LGP 100 through arrangement and distribution of the plurality of second optical microstructures MS2-C on the second light exit surface ES2, and a third pattern may be displayed on one side of the second light exit surface ES2 of the LGP 100 through arrangement and distribution of the plurality of third optical microstructures MS3 on the first light exit surface ES1.

In another aspect, under the irradiation of the third light source LS3, a fifth pattern may be displayed on one side of the second light exit surface ES2 of the LGP 100 through arrangement and distribution of the plurality of fifth optical microstructures MS5 on the first light exit surface ES1, and a sixth pattern may be displayed on one side of the first light exit surface ES1 of the LGP 100 through arrangement and distribution of the plurality of sixth optical microstructures MS6 on the second light exit surface ES2. Under the irradiation of the fourth light source LS4, a seventh pattern may be displayed on one side of the second light exit surface ES2 of the LGP 100 through arrangement and distribution of the plurality of seventh optical microstructures MS7 on the first light exit surface ES1, and an eighth pattern may be displayed on one side of the first light exit surface ES1 of the LGP 100 through arrangement and distribution of the plurality of eighth optical microstructures MS8 on the second light exit surface ES2.

That is, the lighting decoration module 10C provided in this embodiment is capable of performing the function of displaying eight patterns on both sides, and the four patterns displayed on the same side of the LGP 100 may be independently controlled by the first light source LS1, the second light source LS2, the third Light source LS3, and the fourth light source LS4, respectively.

Similar to the plurality of first optical microstructures MS1 and the plurality of third optical microstructures MS3, the plurality of fifth optical microstructures MS5 and the plurality of seventh optical microstructures MS7 are, for instance, concave structures recessed from the first light exit surface ES1 toward the second light exit surface ES2. Similar to the plurality of second optical microstructures MS2-C and the plurality of fourth optical microstructures MS4, the plurality of sixth optical microstructures MS6 and the plurality of eighth optical microstructures MS8 are, for instance, concave structures recessed from the second light exit surface ES2 toward the first light exit surface ES1. Therefore, the fifth surface RS5 of each of the plurality of fifth optical microstructures MS5 is located between the fifth backlight surface BS5 and the third light incident surface IS3 (or the third light source LS3), and the sixth surface RS6 of each of the plurality of sixth optical microstructures MS6 is located between the sixth backlight surface BS6 and the third light incident surface IS3 (or the third light source LS3). The seventh surface RS7 of each of the plurality of seventh optical microstructures MS7 is located between the seventh backlight surface BS7 and the fourth light incident surface IS4 (or the fourth light source LS4), and the eighth surface RS8 of each of the plurality of eighth optical microstructures MS8 is located between the eighth backlight surface BS8 and the fourth light incident surface IS4 (or the fourth light source LS4). Since the profile of the orthogonal projection of the optical microstructures on the corresponding light exit surface according to this embodiment is similar to the profile of the orthogonal projection of the optical microstructures depicted in FIG. 3A, detailed descriptions may be derived from the relevant paragraphs in the previous embodiment and will not be provided hereinafter.

Figure 9:
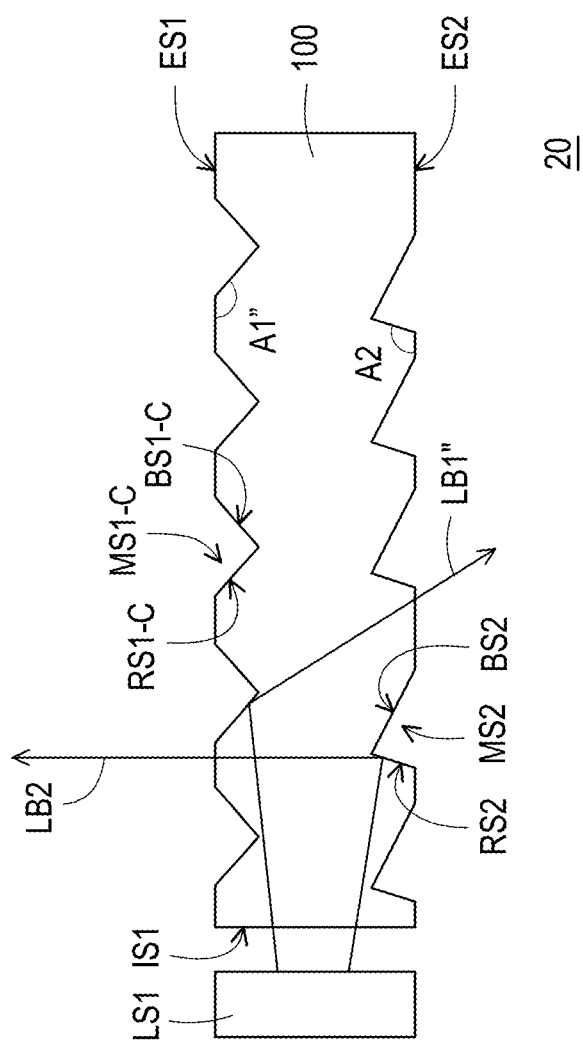
FIG. 9 is a schematic cross-sectional view illustrating a lighting decoration module according to a fifth embodiment of the invention.

FIG. 9 is a schematic cross-sectional view illustrating a lighting decoration module according to a fifth embodiment of the invention. With reference to FIG. 9, the difference between a lighting decoration module 20 provided in this embodiment and the lighting decoration module 10 depicted in FIG. 2 lies in that the first surface of each of the plurality of first optical microstructures is arranged in a different manner. Specifically, in this embodiment, a first angle A1" between the first surface RS1-C of each of the plurality of first optical microstructures MS1-C and the first light exit surface ES1 is greater than or equal to 15 degrees and less than or equal to 35 degrees. Similar to the lighting decoration module respectively provided in each of the previous embodiments, the second angle A2 between the second surface RS2 of each of the plurality of second optical microstructures MS2 provided in this embodiment and the second light exit surface ES2 is greater than or equal to 40 degrees and less than or equal to 60 degrees.

Although the distribution range of the first angle A1" of the first surface RS1-C of each of the plurality of first optical microstructures MS1-C is different from the distribution range of the first angle A1 of the first surface RS1 of each of the plurality of first optical microstructures MS1 depicted in FIG. 2, the manner in which the first backlight surface BS1-C is arranged relative to the first light exit surface ES1 may still be similar to the manner in which the first backlight surface BS1 of each of the plurality of first optical microstructures MS1 is arranged relative to the first light exit surface ES1 as shown in FIG. 2, which should not be construed as a limitation to the invention.

For instance, after the first light beam LB1" emitted by the first light source LS1 is transmitted in the LGP 100 and reflected by the first surface RS1-C, an exit angle of the first light beam LB1" leaving the LGP 100 may be greater than or equal to 30 degrees and less than or equal to 50 degrees. The exit angle is, for instance, an angle between an exit direction of the first light beam LB1" from the second light exit surface ES2 and a normal direction of the second light exit surface ES2. In addition, after the second light beam LB2 emitted by the first light source LS1 is transmitted in the LGP 100 and reflected by the second surface RS2, an exit direction of the second light beam LB2 leaving the LGP 100 is relatively close to a normal direction of the first light exit surface ES1 (e.g., the vertical direction in FIG. 9).

Namely, in the lighting decoration module 20 provided in this embodiment, the light patterns of the exit light on one side of the first light exit surface ES1 are rather concentrated and positive, while the light patterns of the exit light on one side of the second light exit surface ES2 are rather dispersed. Therefore, the lighting decoration module 20 is not only able to perform the aforesaid function of displaying patterns but also capable of providing illumination. For instance, the lighting decoration module 20 provided in this embodiment may serve as a cover plate of a case of a computer host. In such an application scenario, the second light exit surface ES2 of the lighting decoration module 20 may face the inside of the case, while the first light exit surface ES1 of the lighting decoration module 20 may face away from the inside of the case.

When the first light source LS1 is powered on, the first light beam LB1" emitted by the first light source LS1 may be reflected by the plurality of first optical microstructures MS1-C and then guided to the inside of the case, and the second light beam LB2 emitted by the first light source LS1 may be reflected by the plurality of second optical microstructures MS2 and emitted toward a direction away from the computer host. Therefore, the user may clearly see the inside of the case through the LGP 100 while seeing image patterns formed by the plurality of second optical microstructures MS2 on the second light exit surface ES2.

By contrast, in the conventional lighting decoration module that provides the single-side light output, although the user may clearly see the image patterns presented on the LGP, the device inside the case cannot be clearly seen due to the insufficient illumination beam. In other words, the lighting decoration module 20 provided in this embodiment may provide a better visual experience than the conventional lighting decoration module when the lighting decoration module 200 is applied on the cover plate of the case.

In order to further improve the non-directivity required for illumination, according to this embodiment, the plurality of first optical microstructures MS1-C on the first light exit surface ES1 may be conical structures as shown in FIG. 3C;

that is, the profile of the orthogonal projection of each of the plurality of first optical microstructures MS1-C on the first light exit surface ES1 may be circular. On the contrary, in order to meet the directivity requirement of displaying the patterns, the profile of the orthogonal projection of each of the plurality of second optical microstructures MS2 on the second light exit surface ES2 may have a bar shape (as shown in FIG. 3A) or a crescent shape (as shown in FIG. 3B).

In particular, the limited range of the first angle A1" of the first surface RS1-C of each of the plurality of first optical microstructures MS1-C on the first light exit surface ES1 (i.e., greater than or equal to 15 degrees and less than or equal to 35 degrees) and the limited range of the second angle A2 of the second surface RS2 of each of the plurality of second optical microstructures MS2 on the second light exit surface ES2 (i.e., the range from 40 degrees to 60 degrees) provided in this embodiment may also be applicable to each of the previous embodiments to meet the requirements of displaying a plurality of patterns and illumination at the same time, which will not be further described hereinafter.

To sum up, in the lighting decoration module provided in one or more embodiments of the invention, two kinds of optical microstructures are respectively disposed on the two opposite light exit surfaces of the LGP. When the angles between the surfaces of the two types of optical microstructures facing the light source and the corresponding light exit surfaces are greater than or equal to 40 degrees and less than or equal to 60 degrees, the lighting decoration module is allowed to achieve the double-sided display effects on both sides of the two light exit surfaces. When the angle between the surface of one of the two types of optical microstructures facing the light source and the corresponding light exit surface is are within a range from 15 degrees to 35 degrees, and the angle between the surface of the other of the two types of optical microstructures facing the light source and the corresponding light exit surface is within a range from 40 degrees to 60 degree, the lighting decoration module is allowed to achieve a single-sided display effect on one side of one of the light exit surfaces and provide illumination on one side of the other light exit surface.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lighting decoration module, comprising:
    a light guide plate, having at least two light incident surfaces, a first light exit surface, and a second light exit surface, wherein the first light exit surface and the second light exit surface connect the at least two light incident surfaces and are opposite to each other, the at least two light incident surfaces are disposed between the first light exit surface and the second light exit surface, the at least two light incident surfaces comprises a first light incident surface and a second light incident surface, and the first light incident surface is adjacent to and directly connected to the second light incident surface;
    at least two light sources, disposed respectively corresponding to the at least two light incident surfaces of the light guide plate, wherein the at least two light sources comprises a first light source and a second light source, the first light source is disposed on one side of the first light incident surface of the light guide plate, and the second light source is disposed on one side of the second light incident surface of the light guide plate;
    a plurality of first optical microstructures, disposed on the first light exit surface of the light guide plate, wherein an extension direction of each of the plurality of first optical microstructures is parallel to the first light incident surface, each of the plurality of first optical microstructures has a first surface facing the first light sources and extending along the extension direction of each of the plurality of first optical microstructures, and a first angle between the first surface and the first light exit surface is greater than or equal to 40 degrees and less than or equal to 60 degrees;
    a plurality of second optical microstructures, disposed on the second light exit surface of the light guide plate, wherein an extension direction of each of the plurality of second optical microstructures is parallel to the second light incident surface, and each of the plurality of second optical microstructures has a second surface facing the second light source and extending along the extension direction of each of the plurality of second optical microstructures, a second angle between the second surface and the second light exit surface is greater than or equal to 40 degrees and less than or equal to 60 degrees;
    a plurality of third optical microstructures, disposed on the first light exit surface of the light guide plate and each of the plurality of third optical microstructures having a third surface facing the second light source, wherein a third angle between the third surface and the first light exit surface is greater than or equal to 40 degrees and less than or equal to 60 degrees;
a plurality of fourth optical microstructures, disposed on the second light exit surface of the light guide plate and each of the plurality of fourth optical microstructures having a fourth surface facing the first light source, wherein a fourth angle between the fourth surface and the second light exit surface is greater than or equal to 40 degrees and less than or equal to 60 degrees;
a plurality of fifth optical microstructures, disposed on the first light exit surface of the light guide plate; and
a plurality of sixth optical microstructures, disposed on the second light exit surface of the light guide plate, wherein the at least two light sources further comprises a third light source, the at least two light incident surfaces further comprises a third light incident surface, the third light source is disposed on one side of the third light incident surface of the light guide plate, each of the plurality of fifth optical microstructures has a fifth surface facing the third light source, a fifth angle between the fifth surface and the first light exit surface is greater than or equal to 40 degrees and less than or equal to 60 degrees, each of the plurality of sixth optical microstructures has a sixth surface facing the third light source, and a sixth angle between the sixth surface and the second light exit surface is greater than or equal to 40 degrees and less than or equal to 60 degrees.

2. The lighting decoration module according to claim 1, further comprising:
a plurality of seventh optical microstructures, disposed on the first light exit surface of the light guide plate; and
a plurality of eighth optical microstructures, disposed on the second light exit surface of the light guide plate, wherein the at least two light sources further comprises a fourth light source, the at least two light incident surfaces further comprises a fourth light incident surface, the fourth light source is disposed on one side of the fourth light incident surface of the light guide plate, each of the plurality of seventh optical microstructures has a seventh surface facing the fourth light source, a seventh angle between the seventh surface and the first light exit surface is greater than or equal to 40 degrees and less than or equal to 60 degrees, each of the plurality of eighth optical microstructures has an eighth surface facing the fourth light source, and an eighth angle between the eighth surface and the second light exit surface is greater than or equal to 40 degrees and less than or equal to 60 degrees.

3. The lighting decoration module according to claim 1, wherein a profile of an orthogonal projection of the first optical microstructures on the first light exit surface and a profile of an orthogonal projection of the second optical microstructures on the second light exit surface have a bar shape or a crescent shape.

4. A lighting decoration module, comprising:
a light guide plate, having at least two light incident surfaces, a first light exit surface, and a second light exit surface, wherein the first light exit surface and the second light exit surface connect the at least two light incident surfaces and are opposite to each other, and the at least two light incident surfaces are disposed between the first light exit surface and the second light exit surface, wherein the at least two light incident surfaces comprises a first light incident surface and a second light incident surface, and the first light incident surface is adjacent to and directly connected to the second light incident surface;
at least two light sources, disposed respectively corresponding to the at least two light incident surfaces of the light guide plate, wherein the at least two light sources comprises a first light source and a second light source, the first light source is disposed on one side of the first light incident surface of the light guide plate, and the second light source is disposed on one side of the second light incident surface of the light guide plate;
a plurality of first optical microstructures, disposed on the first light exit surface of the light guide plate, wherein an extension direction of each of the plurality of first optical microstructures is parallel to the first light incident surfaces, each of the plurality of first optical microstructures has a first surface facing the first light source and extending along the extension direction of each of the plurality of first optical microstructures, and a first angle between the first surface and the first light exit surface is greater than or equal to 15 degrees and less than or equal to 35 degrees;
a plurality of second optical microstructures, disposed on the second light exit surface of the light guide plate, wherein an extension direction of each of the plurality of second optical microstructures is parallel to the second light incident surfaces, each of the plurality of second optical microstructures has a second surface facing the second light sources and extending along the extension direction of each of the plurality of second optical microstructures, a second angle between the second surface and the second light exit surface is greater than or equal to 40 degrees and less than or equal to 60 degrees;
a plurality of third optical microstructures, disposed on the first light exit surface of the light guide plate and each of the plurality of third optical microstructures having a third surface facing the second light source, wherein a third angle between the third surface and the first light exit surface is greater than or equal to 15 degrees and less than or equal to 35 degrees;
a plurality of fourth optical microstructures, disposed on the second light exit surface of the light guide plate and each of the plurality of fourth optical microstructures having a fourth surface facing the first light source, wherein a fourth angle between the fourth surface and the second light exit surface is greater than or equal to 40 and less than or equal to 60 degrees;
a plurality of fifth optical microstructures, disposed on the first light exit surface of the light guide plate; and
a plurality of sixth optical microstructures, disposed on the second light exit surface of the light guide plate, wherein the at least two light sources further comprises a third light source, the at least two light incident surfaces further comprises a third light incident surface, the third light source is disposed on one side of the third light incident surface of the light guide plate, each of plurality of the fifth optical microstructures has a fifth surface facing the third light source, a fifth angle between the fifth surface and the first light exit surface is greater than or equal to 15 degrees and less than or equal to 35 degrees, each of plurality of the sixth optical microstructures has a sixth surface facing the third light source, and a sixth angle between the sixth surface and the second light exit surface is greater than or equal to 40 degrees and less than or equal to 60 degrees.

5. The lighting decoration module according to claim 4, further comprising:
   a plurality of seventh optical microstructures, disposed on the first light exit surface of the light guide plate; and
   a plurality of eighth optical microstructures, disposed on the second light exit surface of the light guide plate, wherein the at least two light sources further comprises a fourth light source, the at least two light incident surfaces further comprises a fourth light incident surface, the fourth light source is disposed on one side of the fourth light incident surface of the light guide plate, each of the plurality of seventh optical microstructures has a seventh surface facing the fourth light source, a seventh angle between the seventh surface and the first light exit surface is greater than or equal to 15 degrees and less than or equal to 35 degrees, each of the plurality of eighth optical microstructures has an eighth surface facing the fourth light source, and an eighth angle between the eighth surface and the second light exit surface is greater than or equal to 40 degrees and less than or equal to 60 degrees.

6. The lighting decoration module according to claim 4, wherein a profile of an orthogonal projection of the first optical microstructures on the first light exit surface has a circular shape.

7. The lighting decoration module according to claim 4, wherein a profile of an orthogonal projection of the second optical microstructures on the second light exit surface has a bar shape or a crescent shape.

* * * * *